United States Patent [19]
Berry, Jr. et al.

[11] Patent Number: 5,684,661
[45] Date of Patent: Nov. 4, 1997

[54] MAGNETIC HEAD ASSEMBLY AND METHOD FOR READING AND/OR WRITING DATA ONTO A THIN MAGNETIC LAYER PLACED ON A PHOTOGRAPHIC ELEMENT

[75] Inventors: Joseph Richard Berry, Jr., Livonia; Robert Owen James, Rochester; Fred John Oleson, Brockport; Ronald Myron Wexler, Rochester, all of N.Y.

[73] Assignee: Eastman Kodak Company, Rochester, N.Y.

[21] Appl. No.: 421,165

[22] Filed: Apr. 13, 1995

[51] Int. Cl.⁶ ................................................. G11B 15/60
[52] U.S. Cl. ...................... 360/130.31; 360/3; 360/122
[58] Field of Search .............................. 360/3, 104, 131, 360/134, 122, 110, 130.3, 130.31, 130.32

[56] References Cited

U.S. PATENT DOCUMENTS

| | | | |
|---|---|---|---|
| 3,665,436 | 5/1972 | Murray et al. | 366/122 |
| 4,141,735 | 2/1979 | Schrader et al. | 96/75 |
| 4,308,564 | 12/1981 | Thompson | 360/105 X |
| 4,425,594 | 1/1984 | Kodjabashev et al. | 360/129 |
| 4,555,443 | 11/1985 | Kikugawa et al. | 360/134 X |
| 4,745,509 | 5/1988 | Wantanabe et al. | 360/125 |
| 4,821,134 | 4/1989 | Niwa | 360/122 |
| 4,972,219 | 11/1990 | Yamada et al. | 354/322 |
| 5,031,064 | 7/1991 | Ashikawa et al. | 360/122 |
| 5,035,948 | 7/1991 | Saito et al. | 428/329 |
| 5,050,027 | 9/1991 | Meunier et al. | 360/122 |
| 5,274,522 | 12/1993 | Taillie | 360/132 X |
| 5,285,324 | 2/1994 | Weigand et al. | 360/3 |
| 5,294,473 | 3/1994 | Kawamoto | 428/141 |
| 5,313,327 | 5/1994 | Kammerer | 354/106 |
| 5,368,997 | 11/1994 | Kawamoto | 430/533 |
| 5,395,743 | 3/1995 | Brick et al. | 430/496 |
| 5,469,313 | 11/1995 | Isozaki et al. | 360/3 X |

FOREIGN PATENT DOCUMENTS 86-142404  10/1985  European Pat. Off. .
61-267910  11/1986  Japan .

*Primary Examiner*—Andrew L. Sniezek
*Attorney, Agent, or Firm*—Frank Pincelli

[57] ABSTRACT

A method and apparatus for reading and/or recording information on a photographic element having a thin magnetic layer. The apparatus includes a magnetic head assembly having a read and/or write head having an outer engaging surface for contacting the magnetic layer. The outer engaging surface has at least one pole for reading or writing information on the magnetic layer and a protective layer and is made of a material having a Vickers hardness equal to or greater than 1000 kg/mm². A spring is provided for applying a substantially perpendicular loading force between the photographic element and the magnetic read and/or write head. The substantially perpendicular loading being equal to or greater than about 10 gm/mm².

34 Claims, 4 Drawing Sheets

MAGNETIC HEAD ASSEMBLY AND METHOD FOR READING AND/OR WRITING DATA ONTO A THIN MAGNETIC LAYER PLACED ON A PHOTOGRAPHIC ELEMENT

FIELD OF THE INVENTION

The present invention is directed to a magnetic head assembly and method for reading and writing information onto a thin optical transparent magnetic recording layer placed on a photographic element.

BACKGROUND OF THE INVENTION

It is known from various U.S. Pat. Nos. including, 3,782, 947; 4,279,945; 4,990,276; 5,217,804; 5,147,768; 5,229, 259; and others; to include a sensitive silver halide photographic element and an optically transparent magnetic recording layer. Such photographic elements are advantageous because they can be employed to record images by the customary photographic process while at the same time information can be recorded into and read from the magnetic recording layer using magnetic record/read head. The magnetic recording layer is typically coated across the entire photographic element, thus, the necessity for maintaining/providing a very thin magnetic layer such that it is substantially optically transparent.

The use of the photographic element to carry magnetic information on a thin magnetic layer present may present significant problems with respect to reading and writing applications. The presence of the magnetic recording layer can not interfere with the primary function of the photographic element which is to achieve realistic reproductions of the original images recorded thereon. In addition, the magnetic recording layer must be capable of accurately recording information applied thereto and reading out the information out on demand. This is particularly difficult because the loading and distribution of the magnetic particles in the transparent layer must be such as to not interfere with the quality of the photographic elements. The resultant magnetic field set up by the very thin magnetic layer is minimal. To obtain a quality of the read back signal required to meet performance specification intimate contact with the magnetic head and magnetic layer must be maintained.

The photographic element, as is typical in prior art, is coated with a hydroscopic photographic emulsion, which expands and contracts with the presence of moisture in the atmosphere. The effect on the flatness of the medium is perceived and known as curl, representing static forces in the media which oppose mechanically applied flattening force against the magnetic head. In order to avoid degradation of the image area of the film, the magnetic information is preferably placed within a zone located outside of the printable image area which generally lies in close proximity to the film edge. However, this zone is located in an area which undergoes planar deformations due to media properties when subjected to environmental extremes, curvatures in a film transport path, and film tension in the transport path. These deformations resist the flattening of the film which is important in order to provide good contact between the magnetic layer and the magnetic head. To lessen the effect of the curl on the head to film interface, the photographic media is wrapped over a radius of curvature of the magnetic head contact face. This bending of the photographic media creates static forces at the edge, known as anticlastic curl, which tends to lift the film edge from contact with head face. Since photographic film is of substantially greater thickness than of typical magnetic tapes, the edge deformation or anticlastic curl is substantially greater than that which normally occurs in magnetic tape applications. Additionally, since the photographic film is of substantially greater thickness than of typical magnetic tapes, the photographic film exhibits a substantially greater media stiffness which further represents additional opposition to flattening of the film.

Another concern with the use of a thin magnetic layer is the presence of small amounts of residue and/or dirt between the head and film interface, which can adversely affect the ability of the head to read the information from the thin magnetic layer. In order to minimize residue/dirt build up on the head it has been suggested the placement of abrasive particle on the film element to minimize residue build up on the head. However, this can adversely affect the life of the magnetic head.

The present invention provides a magnetic head assembly and method for reading and/or writing information onto a thin magnetic layer placed on a photographic element which overcomes the problems of the prior art.

The detailed features and advantages of the present invention will become more apparent than the following description when taken in conjunction with the accompanied drawings in which preferred embodiments of the present inventions are shown by way of illustrative example.

SUMMARY OF THE INVENTION

In one aspect of the invention there is provided a magnetic head assembly for reading and/or recording information on a photographic element having a thin magnetic layer, the magnetic head assembly comprising:

a read and/or write head having an outer engaging surface for contacting the magnetic layer, the outer engaging surface comprising at least one pole for reading or writing information on the magnetic layer and a protective layer, the protective layer being made of a material having a Vickers hardness equal to or greater than 1000 kg/mm$^2$; and means for providing a substantially perpendicular loading force between the photographic element and the magnetic read and/or write head, the substantially perpendicular loading force being equal to or greater than about 10 gm/mm$^2$.

In another aspect of the present invention there is provided a magnetic head assembly for reading and/or recording information on a photographic element having a thin magnetic layer, the magnetic head assembly comprising:

a read and/or write head having an outer engaging surface for contacting the magnetic layer, the outer engaging surface comprising at least one pole for reading or writing information on the magnetic layer and a protective layer, the protective layer being made of a material having a Vickers hardness equal to or greater than 1000 kg/mm$^2$, the protective layer completely surrounding the at least one pole.

In yet another aspect of the present invention there is provided a system for reading and/or recording information on a thin magnetic layer, comprising:

a photographic element comprising a support member having a top surface and a bottom surface, a light-sensitive emulsion layer provided on the top surface, an optically transparent magnetic layer provided on the bottom surface and a lubricant is provided on the bottom side, the photographic element having a coefficient of friction less than or equal than 0.3; and a read and/or write head having an outer engaging surface for contacting the magnetic layer, the outer engaging surface comprising at least one pole for reading or writing information on the magnetic layer and a protective layer, the protective layer being made of a material having a Vickers hardness equal to or greater than 1000 kg/mm².

In still another aspect of the present invention there is provided a method for reading and/or writing information onto a thin magnetic layer comprising the steps of:

providing a photographic element comprising a support member having a top surface and a bottom surface, a light-sensitive emulsion layer provided on the top surface and a thin optically transparent magnetic layer provided on the bottom surface;

a read and/or write head having an outer engaging surface for contacting the magnetic layer, the outer engaging surface comprising at least one pole for reading or writing information on the magnetic layer and a protective layer, the protective layer being made of a material having a Vickers hardness equal to or greater than 1000 kg/mm²;

applying a substantially perpendicular load between the photographic film and the magnetic read and/or write head, the substantially perpendicular load being equal to or greater than 10 gm/mm²; and moving the photographic element across the magnetic head while the load is being applied to the photographic element.

In still another aspect of the present invention there is provided photographic apparatus for exposing an image onto a photosensitive material, the photographic material having a thin magnetic recording layer, the apparatus having a magnetic head assembly for reading and/or recording information on the photographic material, the magnetic head assembly comprising:

a read and/or write head having an outer engaging surface for contacting the magnetic layer, the outer engaging surface comprising at least one pole for reading or writing information on the magnetic layer and a protective layer, the protective layer being made of a material having a Vickers hardness equal to or greater than 1000 kg/mm²; and means for providing a substantially perpendicular loading force between the photographic element and the magnetic read and/or write head, the substantially perpendicular loading force being equal to or greater than about 10 gm/mm².

DETAILED DESCRIPTION OF THE INVENTION

Figure 1:
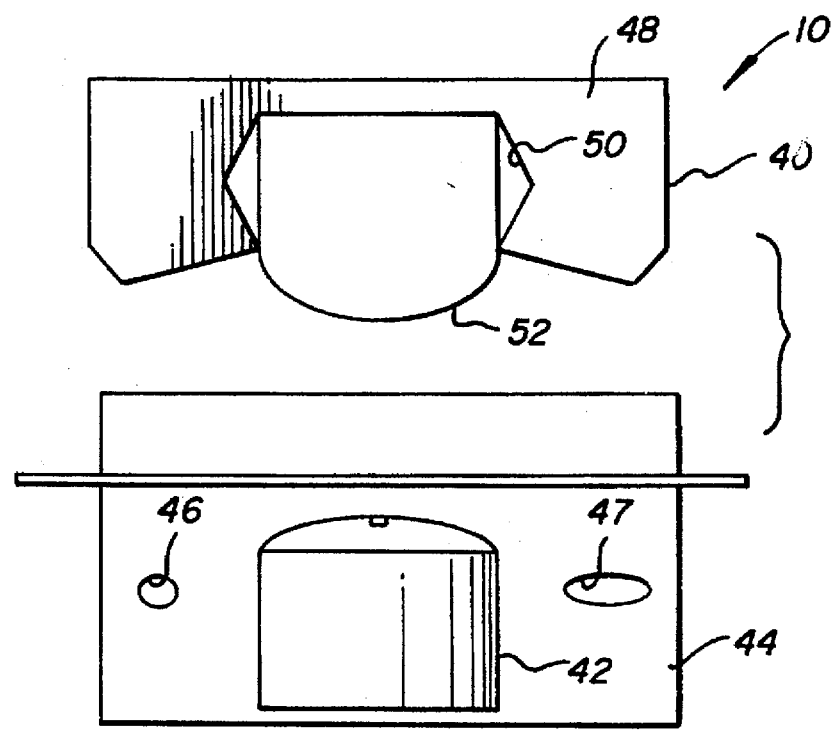
FIG. 1 is a magnetic head assembly made in accordance with the present invention in the non-engaged position which is used for reading and/or writing data onto a thin magnetic layer placed on a photographic element.
Figure 2:
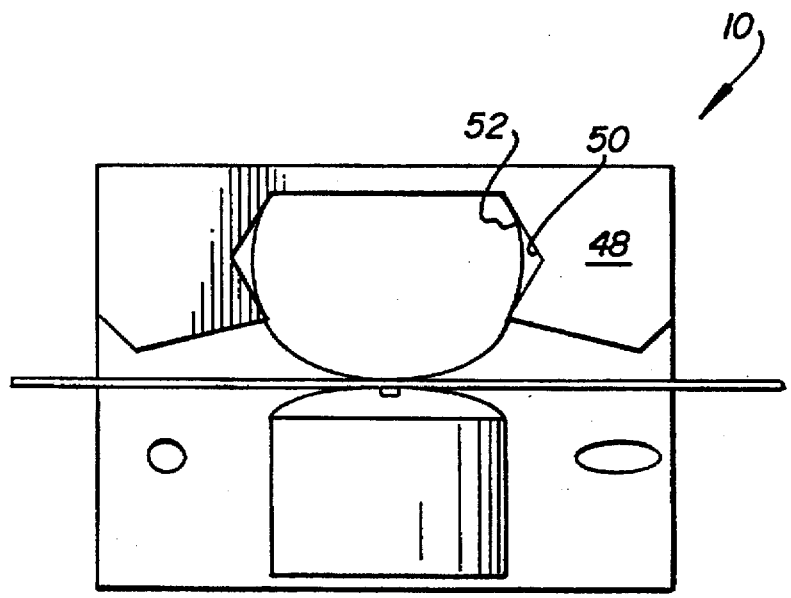
FIG. 2 is view similar to FIG. 1 illustrating the magnetic head assembly in the engaged position for reading and/or writing information onto the magnetic layer placed on the photographic element.
Figure 3:
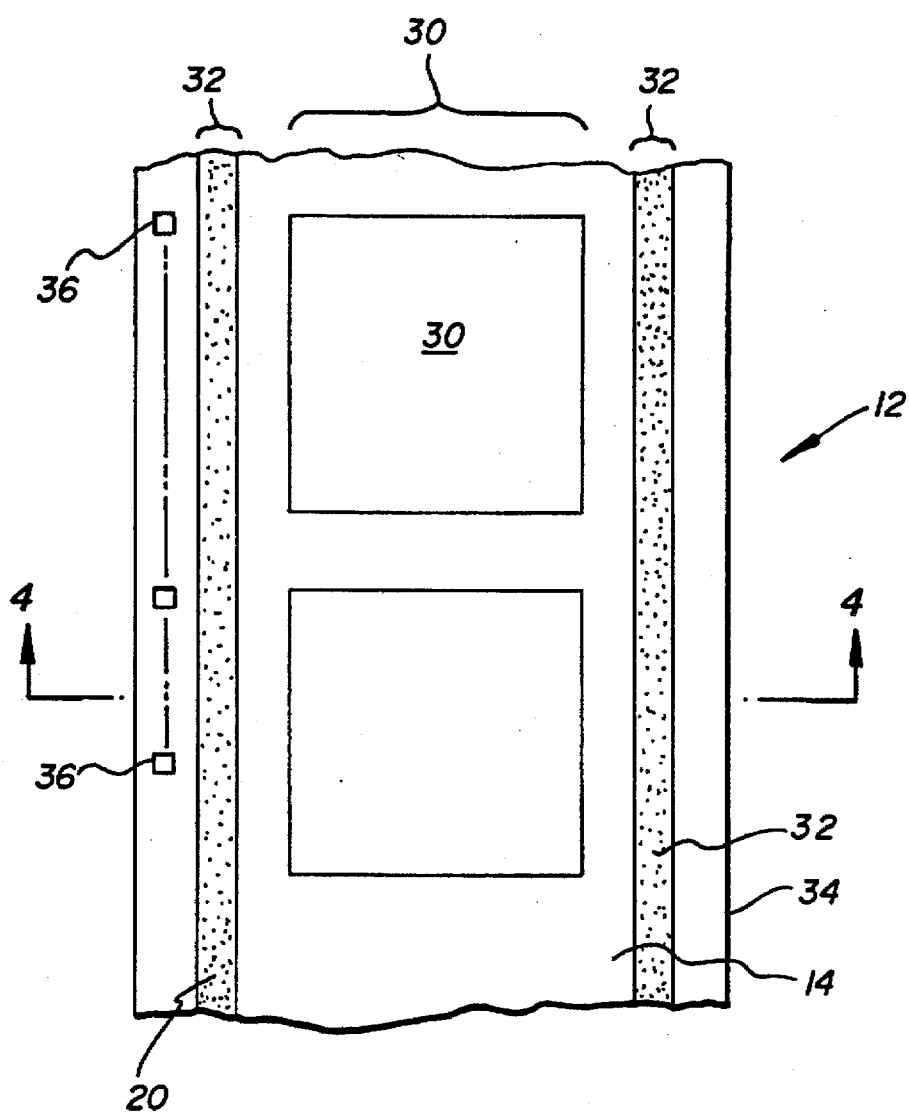
FIG. 3 is a top plan view of a photographic film have a magnetic layer for use in device of FIGS. 1 and 2.
Figure 4:
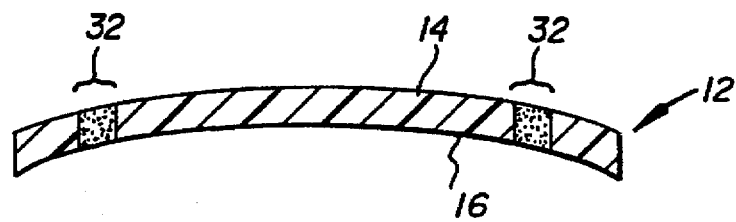
FIG. 4 is a cross-sectional view of the film of FIG. 3 as taken along line 4—4.
Figure 5:
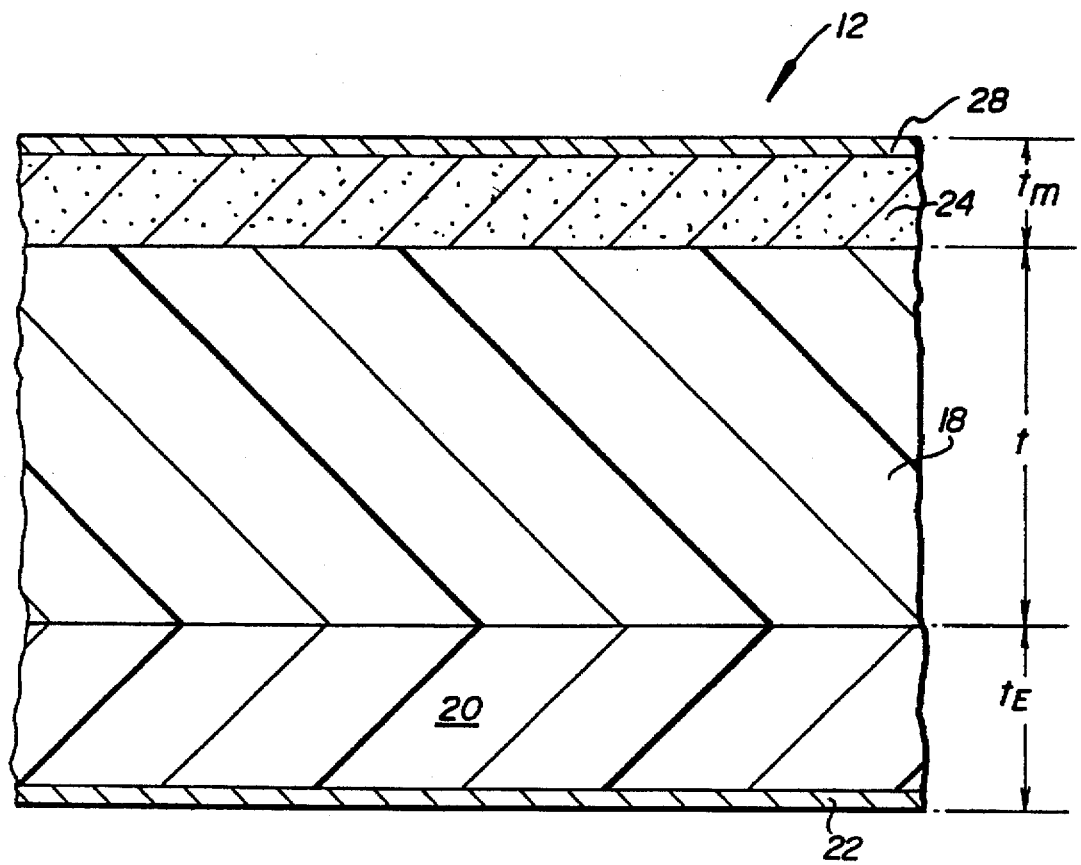
FIG. 5 is greatly enlarged cross-sectional view of the film of FIG. 4 illustrating the various layers of the film.

Referring to FIGS. 1 and 2, there is illustrated a magnetic head assembly 10 made according to the present invention. The magnetic head assembly 10 is designed to read and/or write information onto a very thin optically transparent magnetic layer placed onto a photographic element. In the particular embodiment illustrated, the photographic element is a strip of film 12, such as a 35 mm as is well known in prior art. It is of course understood that the strip of film may be of any desired size. Referring to FIGS. 3, 4, and 5, the photographic film 12 comprises a top surface 14 and the bottom surface 16. The film 12 includes a support member 18 having a thickness t, which in the particular embodiment illustrated, is approximately 85 µm and is made of polyethylene naphthalate (PEN). However, layer 18 may be made of any desired material, e.g., polyethylene terephthalate, a cellulose ester, or cellulose acetate. An emulsion layer 20 is provided on one side of support member 18 with an outer protective layer 22 disposed over the emulsion layer 20. In the particular embodiment illustrated the protective and emulsion layers 20,22 have an combined thickness $t_E$ of approximately 27 µm or less. However, the thickness $t_E$ of layers 20,22 may be any size desired.

Disposed on the opposite side of support member 18 is a thin optically transparent magnetic layer 24. In the particular embodiment illustrated the magnetic layer 24 comprises ferro-magnetic particles and abrasive particles. The magnetic particles have a surface area greater than 30 m²/g and a coverage of from about $1\times10^{-11}$ mg/µm³ to about $1\times10^{-10}$ mg/µm³. The abrasive particles having a mean diameter from about 0.04 µm to 0.4 µm. The specific surface area of the abrasive particles being greater than 5 m²/g and having a Mohs hardness of at least 5 and being present in the transparent magnetic/abrasive layer 24 in the amount of 30% by weight based on the weight of the magnetic particles present. The thin optically transparent magnetic layer 24 typically has a thickness t in the range of about 0.9 to 1.6 microns. In the embodiment illustrated, the layer has a thickness in the range of about 1.1 to 1.3 microns.

A thin lubricant layer 28 is provided on top of layer 24. The lubricant layer 28 and magnetic layer 24 have a combined thickness $t_m$ of about 1.2 µm. It is important that the thickness and physical properties of the lubricant layer 28 and magnetic/abrasive layer 24 be such as not to interfere with the optical properties of the emulsion layer 20. Thus, layers 24,28 are designed to be substantially optically transparent. It should be understood that layers 24,28 may be selected and formulated as desired. A specific example of the formulation of these layers in the film are illustrated in the following co-pending applications, all of which are incorporated herein by reference: U.S. Ser. No. 08/173,793, filed Dec. 22, 1993, entitled PHOTOGRAPHIC ELEMENT HAVING A TRANSPARENT MAGNETIC LAYER AND A PROCESS OF PREPARING THE SAME, Brick et al now U.S. Pat. No. 5,395,743; U.S. Ser. No. 08/173,833, filed Dec. 22, 1993, entitled COATING COMPOSITION FOR A TRANSPARENT MAGNETIC RECORDING LAYER, Wexler now U.S. Pat. No. 5,397,826; U.S. Ser. No. 08/193, 304, filed Feb. 8, 1994, entitled PHOTOGRAPHIC ELEMENT, DeCory et al now U.S. Pat. No. 5,427,900; U.S. Ser. No. 08/193,349, filed Feb. 8, 1994, entitled PHOTOGRAPHIC ELEMENT, Wexler et al now U.S. Pat. No. 5,432,050; U.S. Ser. No. 08/251,883, filed Jun. 1, 1994, entitled PHOTOGRAPHIC ELEMENT, Wexler et al now U.S. Pat. No. 5,436,120; and U.S. Ser. No. 08/252,500, filed Jun. 1, 1994, entitled PHOTOGRAPHIC ELEMENT, Wexler et al now U.S. Pat. No. 5,434,037.

While in the particular embodiment illustrated a separate lubricant layer 28 is provided, a lubricant may be impregnated into the magnetic layer 24 and avoid providing of a separate layer. Also, the abrasive particles may be in a separate layer from the magnetic layer.

In the particular embodiment illustrated, the lubricant layer 28 comprises caranuba wax, waxes, surfactants, and wetting agents. The film is designed such that the coefficient of friction between the film and the magnetic head is equal to or less than 0.3, preferably less than or equal to 0.2 and most preferably, less than or equal to 0.15. In the embodiment illustrated, the coefficient of friction ranges from about 0.08 to 0.16.

Referring to FIG. 3, there is illustrated a top plan view of film 12. As is typical, on film 12 there is provided image area 30 wherein images 31 are formed in the emulsion layer 20. Disposed laterally outside of the image area 30 there is provided magnetic recording areas 32, each being disposed outside of the image areas 30 and adjacent the edge 34 of the film. The magnetic recording area 32 is placed axially outside the image area 30 so as to minimize or avoid degradation of the image on the film. However, as can be seen from FIG. 4, the magnetic recording areas 32 are placed in the areas of the film having the most curl. It is not unusual for the film to have a cross web curl equal to or less than 70 1/m, typically in the range of 5 to 45 1/m. In addition to the curl exhibited by the film, the overall stiffness of the film contributes to making it difficult to read and/or write information on the thin magnetic layer 24. In the embodiment illustrated, the film 12 has a modulus of elasticity in the range of about $8 \times 10^5$ to $1.2 \times 10^6$ lbs/in$^2$. As is typical with such films, perforations 36 may be provided adjacent the edges 34 for assisting with moving of the film within the camera or printer, or for identifying the image area 30.

Referring back to FIGS. 1 and 2, the magnetic head assembly 10 further includes a backer plate assembly 40 is provided for engagement with magnetic head 42 through any desired means. In the particular embodiment illustrated, the magnetic head 42 is secured to a mounting block 44 having a pair of openings 46,47 for mounting of the mounting block 44 to an apparatus. In the particular embodiment illustrated, the openings 46,47 are sized so as to receive a pair of threaded screws (not shown) designed to be received by threaded openings (not shown). The magnetic head assembly 10 is preferably designed to be used in a high speed photographic printing apparatus for printing of photographic images onto photosensitive material. An example of such a device is illustrated by the Kodak Clas 35 printer which can produce prints at a rate of about 3 images per second. As illustrated in FIG. 2, the back plate assembly 40 is designed to apply a loading force against the back of the film 12 such that the magnetic layer 24 will be in direct and intimate contact with the head 42. The backer assembly 40 includes a frame 48 which defines a cavity 50 designed to hold a reed-like backer member (bubble spring) 52 adapted to urge film 12 in contact with the head 42. An example of a suitable backer plate assembly 40 is described in detail in U.S. Pat. No. 5,274,522, which is owned by the assignee of the instant application and is hereby incorporated by reference. The backer plate assembly 40 is designed such that when in the engaged position as illustrated in FIG. 2 a substantially perpendicular loading force will be applied to the head 42 so as to apply a minimum pressure against the film. Preferably the average contact pressure within about 0.85 mm of the gap is greater than about 10 g/mm$^2$. In the particular embodiment illustrated, the backer plate assembly 40 is designed so as to provide a loading force in the range of approximately 20 to 50 g/mm$^2$.

The magnetic head assembly 10 is designed for use in minilab and full-lab situations where printing can occur at relatively fast velocities. Typical velocity in photographic printers is generally equal to or greater than about 100 mm/sec. In typical minilab situations, the film can be moved at speeds equal to or excess of 250 mm/sec, and in wholesale applications film can move at speeds upwards of 400 mm/sec. In order to minimize the degree of wear in the head 42, it is important that the head be designed to be resistant to the resulting forces from the film sliding along the engaging surface of the head. This is of particular importance in view of the significant force being applied by the backup plate assembly and the abrasive materials present on the film.

Referring to FIGS. 6, 7, 8, and 9, there is disclosed in more detail the magnetic head 42. In particular, the magnetic head 42 has an outer engaging surface 60 designed to contact the magnetic record area 32 of the film 12. Mounting block 44 is provided with a guide surface 62 designed to engage one of the edges 34 of the film such that the film 12 will be positioned accurately with respect to the magnetic head 42 such that the magnetic information contained in the magnetic recording areas 32 of magnetic layer 24 can be properly aligned with the head 42. The magnetic head 42 includes at least one pole 64 for reading and writing information on the magnetic layer 24. In the particular embodiment illustrated, there are two poles 64 which are spaced apart a distance D which in the particular embodiment illustrated is about 1.2 mm. Each of the poles 64 includes a gap 66 at which the magnetic information is either read or placed onto the magnetic layer. A protective layer 68 is provided on head 42 for minimizing wear. The protective layer 68 and poles 64 combine together to form the outer engaging surface 60 which actually engages and contacts film 12. The protective layer 68 is made out of a hard protective material. The hardness of the protective layer 68 is designed so as to resist wear caused by the abrasive material in the film. The Vickers hardness of layer 68 is equal to or greater than 1000 kg/mm$^2$, preferably greater than about 1700 kg/mm$^2$. In the embodiment illustrated, protective layer 68 is made of ceramic, in particular, the protective layer 68 is an inorganic matrix material composed of aluminum oxide with titanium carbide particles of about 1.0 μm dispersed through out, and optionally with zirconium oxide, the titanium carbide particles comprising in the range of about 25 to 40% by weight of the composite. A source of suitable ceramic material is sold by Kyocera Corporation under the trade name TF400L. However, it should be understood that other materials such as zirconium oxide may be used. As can best be seen by reference to FIG. 6, the protective layer completely surrounds pole 64 such that the magnetic layer 24 will contact either the poles 64 or protective layer 68. The outer engaging surface 60 is preferably designed to have a radius R, such that the film will come in close contact with the outer engaging surface 60. Preferably, the radius R may range from 15 mm to 50 mm. In the particular embodiment illustrated, the radius R is about 30 mm.

Figure 6:
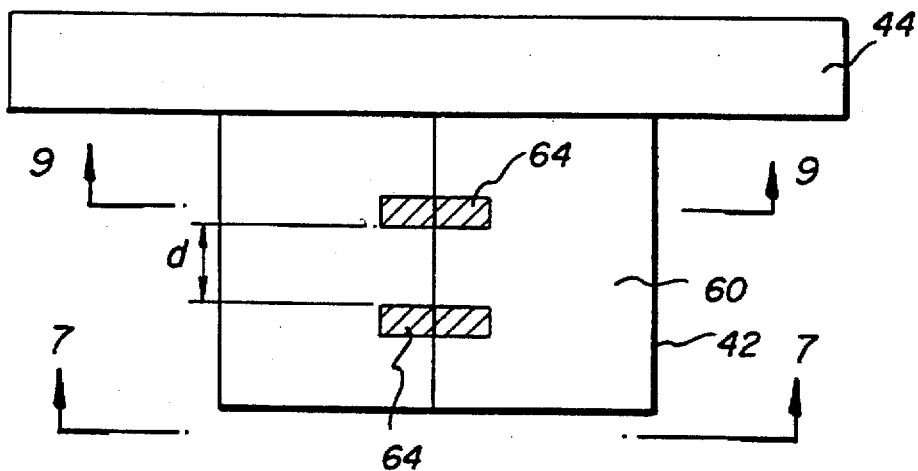
FIG. 6 if the top plane view of the magnetic head of the assembly of FIG. 1.
Figure 7:
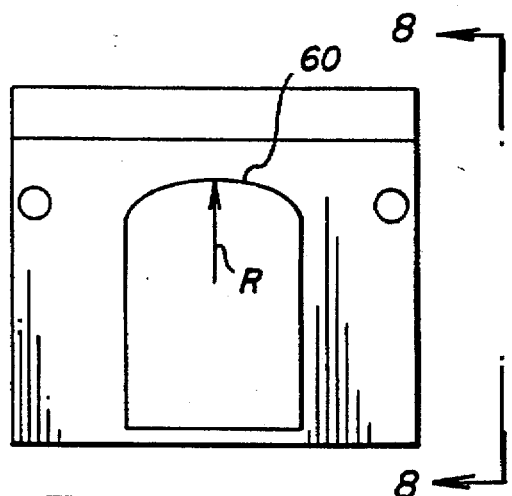
FIG. 7 is a front elevation view of the head of FIG. 6 as taken along the line 7—7.
Figure 8:
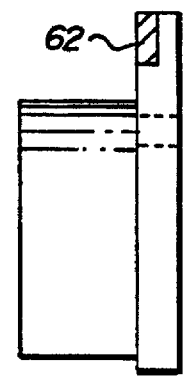
FIG. 8 is an end view of the magnetic head of FIG. 7 as taken along line 8—8 of FIG. 7.
Figure 9:
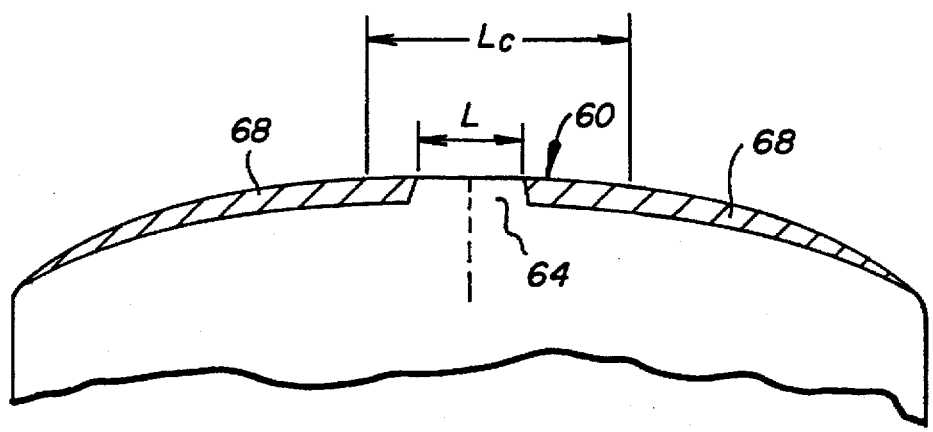
FIG. 9 is the cross-sectional view of the head of FIG. 6 as taken along the line 9—9.

In order to ensure that appropriate signals are being obtained from head 42, each of the poles 64 has a length L in the direction of travel of the photographic film 12 equal to or less than about 1.5 mm, preferably less than or equal to 1.0 mm. In the particular embodiment illustrated, length L is equal to about 0.5 mm. The contact length $L_c$ between the photographic film 12 and the outer engaging surface 60 is preferably equal to or greater than about 0.5 mm, preferably greater than or equal to 1.0 mm. In the particular embodiment illustrated, the length $L_c$ is approximately 1.0 mm. As illustrated in FIG. 6, the protective layer 68 completely surrounds the pole 64.

It is to be understood that various changes and modifications may be made without departing from the scope of the present invention.

Figure 10:
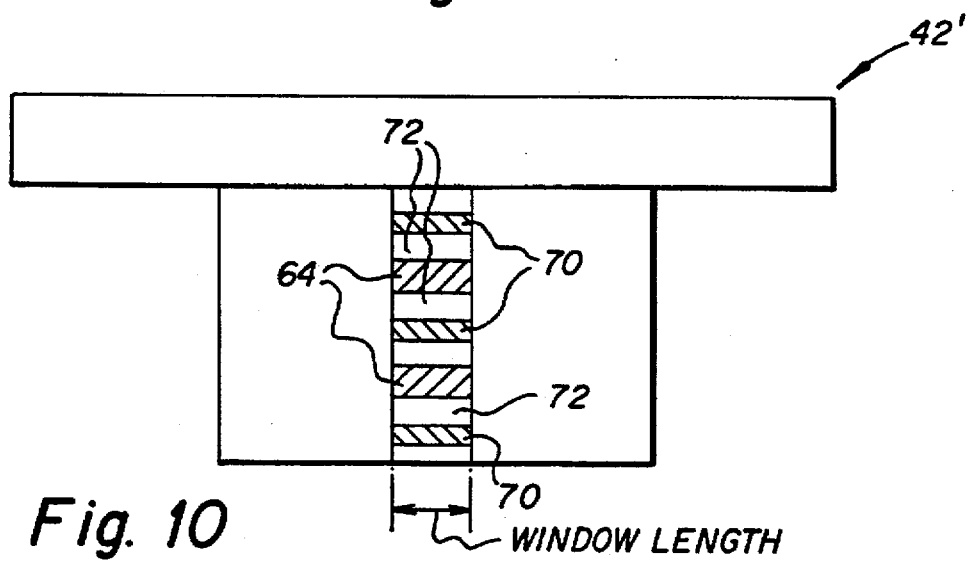
FIG. 10 is the top plan view of an alternate magnetic head made in accordance with this invention.

Referring to FIG. 10, there is illustrated a modified head 42', which is similar to magnetic head 42, like numerals indicating like parts. In this embodiment, two poles 64 are provided which are separated by shields 70 and spacer sections 72, which are typically made of a material softer than the protective layer. In this embodiment, the protective layer 68 extends on either side of the poles 64 in the direction of travel of the film 12. While this embodiment may be somewhat easier to construct, it is not as preferable as the embodiment illustrated in FIGS. 1–9.

In order to more fully understand the present invention, a brief description of its use will now be described. Prior to the assembly, the backer plate assembly is separated from the magnetic head 42 as illustrated in FIG. 1. Once assembled, the head assembly will be as illustrated in FIG. 2. The film is slid between the head 42 and plate assembly 40. The film 12 is driven by appropriate film drive means (not shown) such that the film is wrapped about the head 42 as illustrated in FIG. 2. One of the edges 34 of the film 12 is biased against guide surface 42 such that the poles 64 will be aligned with the magnetic recording area 32. The backer member 40 causes the surface of the film containing the magnetic layer to be pressed against the gap area as it is being moved along the head 42. The backer plate assembly 40 maintains the film in direct intimate contact with head 42. After the magnetic information has been read from or placed onto the magnetic layer 24, the backer plate assembly 40 may be disengaged as appropriate.

It is to be understood that various other changes and modifications may be made without departing from the scope of the present invention, the present invention being limited by the following claims.

Parts List

10 . . . assembly
12 . . . film
14 . . . top surface
16 . . . bottom surface
18 . . . support member
20 . . . emulsion layer
22 . . . outer protective layer
24 . . . magnetic layer
28 . . . lubricant layer
30 . . . image area
31 . . . images
32 . . . magnetic recording areas
34 . . . edges
36 . . . perforations
40 . . . backer plate assembly
42 . . . magnetic head
42'. . . modified head
44 . . . mounting block
46,47 . . . openings
48 . . . frame
50 . . . cavity
52 . . . reed-like backer member
60 . . . outer engaging surface
62 . . . guide surface
64 . . . poles
66 . . . gap
68 . . . protective layer
70 . . . shields
72 . . . spacer sections

We claim:

1. A magnetic head assembly for reading and/or recording information on a photographic element having a thin magnetic layer, said magnetic head assembly comprising:

a read and/or write head having an outer engaging surface for contacting said magnetic layer, said outer engaging surface comprising at least one pole for reading or writing information on said magnetic layer and a protective layer, said protective layer being made of a material having a Vickers hardness equal to or greater than 1000 kg/mm$^2$; and means for providing a substantially perpendicular loading force between said photographic element and said magnetic read and/or write head, said substantially perpendicular loading being about 10 gm/mm$^2$ or greater than 10 gm/mm$^2$.

2. A magnetic head assembly according to claim 1 wherein said length of said pole is equal to or less than 1.0 mm.

3. A magnetic head assembly according to claim 1 wherein said protective layer is made of a ceramic material.

4. A magnetic head assembly according to claim 1 wherein said protective layer is made of zirconium oxide.

5. A magnetic head assembly according to claim 1 wherein said protective layer is made of a material having a Vickers hardness equal to or greater than 1700 kg/mm$^2$.

6. A system for reading and/or recording information on a thin magnetic layer, comprising:

a photographic element comprising a support member having a top surface and a bottom surface, a light-sensitive emulsion layer provided on the top surface and an optically transparent magnetic layer provided on the bottom surface, said magnetic recording layer comprising a transparent polymeric binder, ferromagnetic particles and abrasive particles, the magnetic particles having a surface area greater than 30 m$^2$/gm and a coverage of from about $1 \times 10^{-11}$ mg/$\mu$m$^3$ to about $1 \times 10^{-10}$ mg/$\mu$m$^3$, the abrasive particles having a median diameter of from about 0.04 to about 0.4 $\mu$m, the specific surface area greater than 5 m$^2$/gm, a Mohs hardness of at least 6 and being present in the transparent magnetic layer in an amount of at least 30% by weight based on the weight of the magnetic particles present;

a read and/or write head having an outer engaging surface for contacting said magnetic layer, said outer engaging surface comprising at least one pole for reading or writing information on said magnetic layer and a protective layer, said protective layer being made of a material having a Vickers hardness equal to or greater than 1000 kg/mm$^2$; and means for providing a substantially perpendicular load between said photographic element and said magnetic read and/or write head, said substantially perpendicular load being equal to or greater than about 10 gm/mm$^2$.

7. A system according to claim 6 wherein said length of said pole is equal to or less than 1.0 mm.

8. A system according to claim 6 wherein said protective layer is made of a ceramic material.

9. A system according to claim 6 wherein said protective layer is made of zirconium oxide.

10. A system according to claim 6 wherein said protective layer is made of a material having a Vickers hardness equal to or greater than 1700 kg/mm$^2$.

11. A system for reading and/or recording information on a thin magnetic layer, comprising:

a photographic element comprising a support member having a top surface and a bottom surface, a light-sensitive emulsion layer provided on the top surface and an optically transparent magnetic layer provided on the bottom surface;

a read and/or write head having an outer engaging surface for contacting said magnetic layer, said outer engaging surface comprising at least one pole for reading or writing information on said magnetic layer and a protective layer, said protective layer being made of a material having a Vickers hardness equal to or greater than 1000 kg/mm$^2$; and means for providing a substantially perpendicular load between said photographic element and said magnetic read and/or write head, said substantially perpendicular load being equal to or greater than about 10 gm/mm$^2$, said pole having a length in the direction of travel of the photographic element equal to or less than about 1.5 mm, the contact length between said photographic element and said read and/or write head being equal to or greater than about 0.85 mm.

12. A system according to claim 11 wherein said length of said pole is equal to or less than 1.0 mm.

13. A system according to claim 11 wherein said length of said pole is equal to or less than 0.5 mm.

14. A system according to claim 11 wherein said contact length is equal to or greater than about 1.0 mm.

15. A system according to claim 11 wherein the photographic element comprises a strip of photographic film.

16. A system according to claim 11 wherein said protective layer is made of zirconium oxide.

17. A system according to claim 11 wherein said protective layer is made is an inorganic matrix material composed of aluminum oxide with titanium carbide particles, and optionally zirconium oxide particles, of about 1.0 μm dispersed through out, the titanium carbide particles comprising in the range of about 25 to 40% by weight of the composite.

18. A system according to claim 11 wherein said means for providing substantially perpendicular load comprises a spring which provides a minimum uniform pressure between said head and said photographic element.

19. A system according to claim 18 wherein the coefficient of friction between said spring and said photographic element is in the range of 0.08 to 0.16.

20. A system according to claim 18 wherein the coefficient of friction between said spring and said photographic element is about 0.16.

21. A system according to claim 11 wherein said protective layer is made of a material having a Vickers hardness equal to or greater than 1700 kg/mm$^2$.

22. A system according to 11 wherein said photographic element has a elastic modulus in the range of about 8×10$^5$ to 1.2×10$^6$ pounds per square inch.

23. A system according to claim 11 wherein said photographic element has a cross web curl equal to or less than 70 m$^{-1}$.

24. A system according to claim 11 wherein said photographic element has a cross web curl in the range of 5 to 45 m$^{-1}$.

25. A system according to claim 11 wherein said support member of said photographic element is made of polyethylenenaphthalate.

26. A system according to claim 11 wherein said support member of said photographic element is made of polyethyleneterephthalate.

27. A system according to claim 11 wherein said support member of said photographic element is made of cellulose acetate.

28. A method for reading and/or writing information onto a thin magnetic layer comprising the steps of:

providing a photographic element comprising a support member having a top surface and a bottom surface, a light-sensitive emulsion layer provided on the top surface and a thin optically transparent magnetic layer provided on the bottom surface;

a read and/or write head having an outer engaging surface for contacting said magnetic layer, said outer engaging surface comprising at least one pole for reading or writing information on said magnetic layer and a protective layer, said protective layer being made of a material having a Vickers hardness equal to or greater than 1000 kg/mm$^2$;

applying a substantially perpendicular load between said photographic film and said magnetic read and/or write head, said substantially perpendicular load being equal to or greater than 10 gm/mm$^2$; and moving said photographic element across said magnetic head while said load is being applied to said photographic element.

29. A method according to claim 28 wherein the photographic element is moved at a velocity equal to or greater than about 100 mm/sec.

30. A method according to claim 28 wherein said photographic element is moved at a velocity equal to or greater than about 250 mm/sec.

31. A method according to claim 28 wherein the photographic element is moved at a velocity equal to or greater than about 400 mm/sec.

32. A method according to claim 28 wherein said magnetic layer has a thickness in the range of about 0.9 to 1.6 microns.

33. A method according to claim 28 wherein said magnetic layer has a thickness in the range of about 1.1 to 1.3 microns.

34. A photographic apparatus for exposing an image onto a photosensitive material, said photographic material having a thin magnetic recording layer, said apparatus having a magnetic head assembly for reading and/or recording information on said photographic material, said magnetic head assembly comprising:

a read and/or write head having an outer engaging surface for contacting said magnetic layer, said outer engaging surface comprising at least one pole for reading or writing information on said magnetic layer and a protective layer, said protective layer being made of a material having a Vickers hardness equal to or greater than 1000 kg/mm$^2$; and means for providing a substantially perpendicular loading force between said photographic element and said magnetic read and/or write head, said substantially perpendicular loading being about 10 gm/mm$^2$ or greater than 10 gm/mm$^2$.

* * * * *